(12) United States Patent
McCorkendale et al.

(10) Patent No.: US 8,977,604 B1
(45) Date of Patent: Mar. 10, 2015

(54) GENERATION AND USAGE OF SEARCH RESOURCE LOCATORS

(75) Inventors: Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1497 days.

(21) Appl. No.: 11/691,317

(22) Filed: Mar. 26, 2007

(51) Int. Cl.
*G06F 17/30* (2006.01)

(52) U.S. Cl.
USPC ............ 707/705; 709/219; 707/711; 707/723

(58) Field of Classification Search
USPC ............................ 707/705, 711, 723; 709/219
See application file for complete search history.

(56) References Cited

U.S. PATENT DOCUMENTS

2004/0024848 A1* 2/2004 Smith et al. ................... 709/219
2007/0288473 A1* 12/2007 Mukherjee et al. ............. 707/10

* cited by examiner

*Primary Examiner* — Belix M Ortiz Ditren
(74) *Attorney, Agent, or Firm* — Brill Law Office; Jeffrey Brill

(57) ABSTRACT

A unique (or nearly unique) set of search terms (called a "Search Resource Locator," or SRL) is used to locate information on a web page. An SRL can be used like a Uniform Resource Locator (URL) as a navigational element that finds and brings up a corresponding web site. Unlike a URL, however, an SRL is not a static address for the web site, but is instead a representation of a collection of search terms that can be used to find the site or a substantially similar site. A provided tool generates SRLs for web pages.

20 Claims, 3 Drawing Sheets

GENERATION AND USAGE OF SEARCH RESOURCE LOCATORS

TECHNICAL FIELD

This invention pertains generally to locating web content, and more specifically to using a set of search terms to link to a target web page.

BACKGROUND ART

Web pages are frequently moved. Because of this, links to them on other pages can become stale. All web users have had the frustrating experience of attempting to link to a page of interest, only to receive an error message stating that that the page cannot be found. Very often, this is not because the page no longer exists, but because it has been moved to a new server or the like. Furthermore, if it is in fact the case that the page no longer exists, the user is not provided with any resources for obtaining information similar to that provided by the page. Links to web pages in the form of Uniform Resource Locators (URLs) become useless if a web page is moved within a given site, moved to a completely different site or eliminated altogether.

What is needed is a more flexible and long lasting mechanism for locating the information represented by a web page.

SUMMARY

Search terms that result in the location of a target web page when fed to a search engine are substituted for fixed addresses (URLs) in links. By defining a set of unique (or nearly unique) search terms corresponding to a web page, these terms can be used as a "Search Resource Locator," or SRL. Clicking on an SRL triggers a search for the terms, which returns the page regardless of whether it has been moved. If desired, the search terms can be loosely mapped to the target content, so that selecting the SRL returns similar content if the target web page no longer exists. SRLs can take various forms, such as the URL of a search engine plus the search terms, or a markup language extension such as a new or revised Hypertext Markup Language ("HTML") tag.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
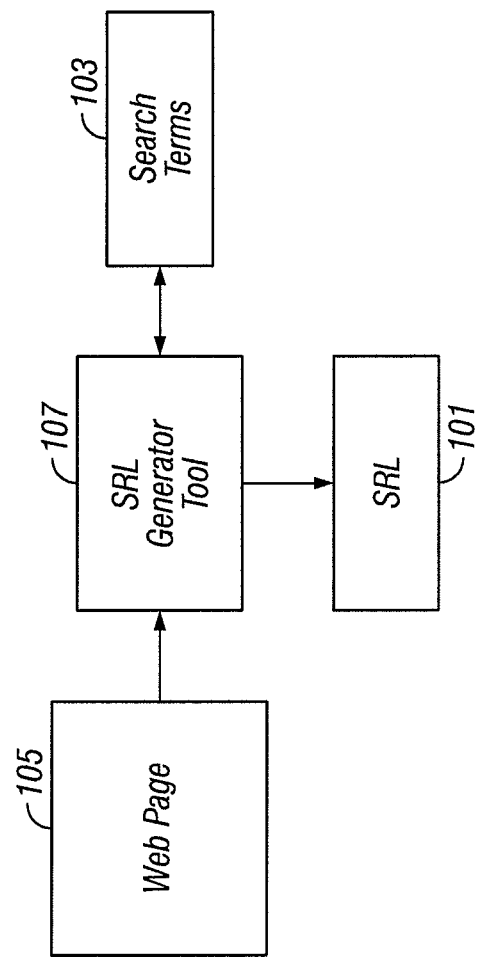
FIG. 1 is a block diagram illustrating the operations of an SRL generation tool, according to some embodiments of the present invention.

FIG. 1 illustrates a system for generating and utilizing Search Resource Locators (SRLs) 101, according to some embodiments of the present invention. An SRL 101 is a selectable representation of information including search terms 103 that can be used to locate a web page 105. An SRL 101 can be in the form of a link that when clicked triggers a search for the terms 103 that the SRL 101 contains. Various possible SRL 101 formats are discussed in detail below.

It is to be understood that although the SRL generator tool 107 is illustrated in FIG. 1 as a separate entity, as used herein the term "SRL generator tool" 107 refers to a collection of functionalities which can be implemented as software, hardware, firmware or any combination of these. Where an "SRL generator tool" 107 is implemented as software, it can be implemented as a standalone program, but can also be implemented in other ways, for example as part of a larger program, as a plurality of separate programs, as a kernel loadable module, as one or more device drivers or as one or more statically or dynamically linked libraries. Of course, an SRL generator tool 107 can be centralized or distributed, and can run on one or more servers, clients or any other type of computing devices, including hand held devices.

As illustrated in FIG. 1, in one embodiment an SRL generator tool 107 is used on a source web page 105 to generate the set of search terms 103 to be embedded within an SRL 101. The SRL generator 107 can be configured to specify how similar the search results should be to the source page 105. If desired, search terms 103 that result in an exact match of the web page 105 can be required. An exact match requirement reduces the function (but not the implementation) of an SRL 101 to that of a URL, except that an identical web page 105 that has been moved to a new location can still be found using the SRL 101. SRLs 101 generated with less stringent matching criteria can be used to find edited versions of the underlying source page 105. The matching criteria of an SRL 101 can even be tuned loosely enough that if the source page 105 is eliminated altogether, the SRL 101 can still be used to find substantially similar information if it exists. A page 105 containing such SRLs 101 (which can be thought of as essentially a set of links created with the SRL generation tool 107) remains accurate far longer and is much easier to maintain than an equivalent page 105 containing a set of traditional URL links.

It is to be understood that various methodologies are known for generating search terms for given content such as a web page 105. The implementation mechanics of using such methodologies within the context of the present invention will be readily apparent to those of ordinary skill in the relevant art in light of this specification. The use of any methodology for generating a set of search terms 103 is within the scope of the present invention.

Figure 2:
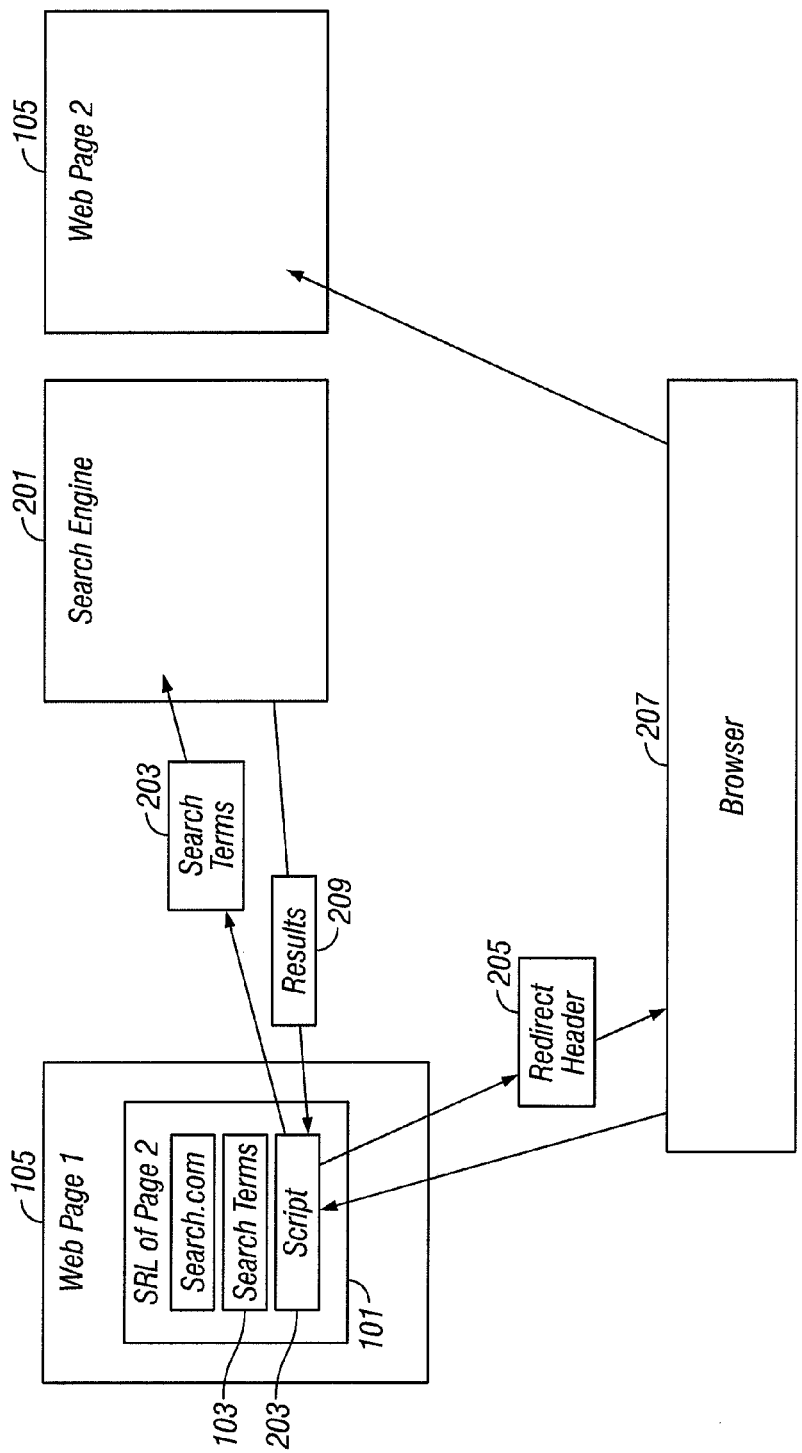
FIG. 2 is a block diagram illustrating operations of embodiments of the present invention in which an SRL comprises search terms and the URL of a search engine.

As illustrated in FIG. 2, in one embodiment of the present invention an SRL 101 can simply be in the form of the URL of a search engine 201, plus the search terms 103 to pass to the search engine 201 to generate the target page 105. The resulting SRL 101 can then be added to web pages 105 as desired. Clicking on the SRL 101 triggers execution of a script 203 or the like to pass the search terms 103 to the search engine 201, and point the user's browser 207 to the resulting web page 105. More specifically, selecting the SRL 101 links the user to the search engine 201 and inputs the search terms 103. Based on the search results 209, a redirect header 205 to the target web page 105 is returned to the browser 207. This points the user's browser 207 to the web page 105 that results from the search. As with selecting a traditional URL based link, clicking on the SRL 101 causes the target web page 105 to appear in the user's browser 207.

Figure 3:
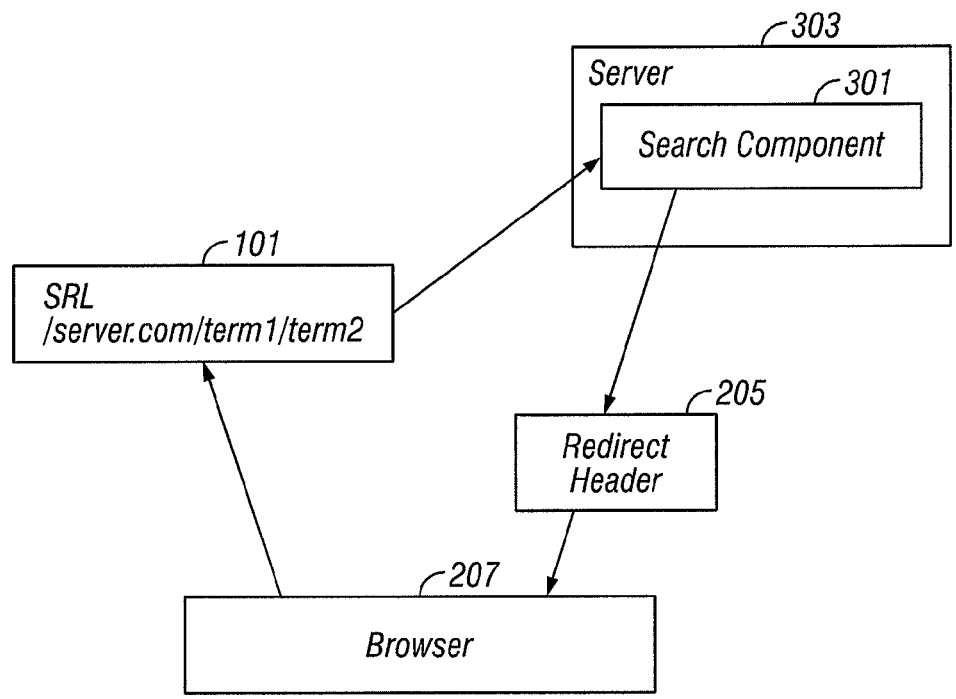
FIG. 3 is a block diagram illustrating embodiments of the present invention that include a server based search component.

FIG. 3 illustrates another embodiment of the present invention, in which an SRL search component 301 runs on, e.g., a server computer 303. It is to be understood that although the SRL search component 301 is illustrated as a single entity, the SRL search component 301, like the SRL generation tool 107, represents a collection of functionalities. In the embodiment of FIG. 3, an SRL 101 is in the form of a URL that includes the address of the server 303 (e.g., www.srl.com), such that the relative URL elements on that domain constitute the search terms 103 (e.g. www.srl.com/term1/term2/term3 etc.). When a user selects such an SRL 101, the search component 301 conducts the search for the terms 107, and responds with a redirect header 205 that points the browser 207 to the page 105 resulting from the hit. In this embodiment, an SRL 101 is essentially a URL that points to a web server 303 that implements this scheme, plus the search terms 103 in the form of URL elements.

In other embodiments, an SRL 101 is implemented in the form of a markup language extension (e.g., an extension to the HTML specification), such that a new tag can accommodate a standardized listing of search terms 103 and descriptive text. For example, the anchor tag could be extended with an "sterm" attribute as follows: <a sterm="+'search term generation'+web +page +matching" tolerance="1.0" alturl="standard url" title="title">link text </a>

The sterm attribute can adopt standardized search terms 103 specification syntax such as regex, or that in use on any of the popular search engines 201 such as Google (e.g. see http://www.google.com/intl/en/help/basics.html). An optional tolerance attribute can be used to control the required degree of match at link time. For example, a tolerance of 1.0 could indicate that the search has to be exact, or a "not found" page 105 should be displayed. The alturl attribute could be used to specify a standard URL for use in cases where the tolerance has not been met (e.g., the address of the "not found" page 105).

In various embodiments of the present invention, when the tolerance level is met (or no tolerance level is specified), clicking on an SRL 101 causes the display of the most relevant result 209 of the search. In some embodiments, once the browser 207 has displayed the target page 105, enhancements to the browser 207 can allow access to the complete search results 209, for example through a toolbar icon or some other access method. In other embodiments, by default the entire list of search results 209 is displayed to the user.

Figure 4:
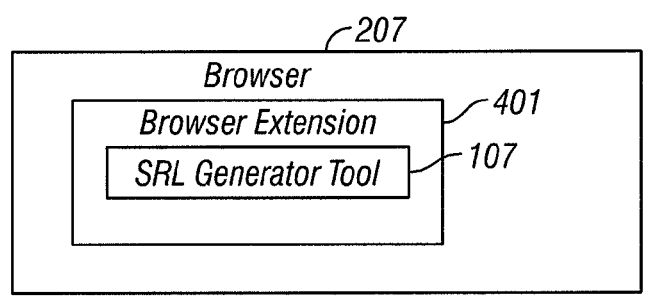
FIG. 4 illustrates a browser based tool for easy distribution of the present invention, according to some embodiments.

As illustrated in FIG. 4, in some embodiments of the present invention an SRL generator tool 107 is made widely available for quick generation of an SRL 101 for any page 105 visited. For example, the SRL generator tool 107 can be attached to web browsers 207, for example in the form of a browser extension 401.

It is to be understood that the specific formats for SRLs 101 described above are only examples. Other SRL 101 formats comprising a set of search terms 103 that result in a desired web page 103 (or substantially similar content) will be readily apparent to those of ordinary skill in the relevant art in light of this specification. All such variations are within the scope of the present invention. Likewise, whereas the specification primarily describes using SRLs 101 to link to web pages 105, SRLs 101 can of course be generated and utilized within the context of other types of content as desired.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as computer program products. As will be readily apparent to one of ordinary skill in the relevant art, any form of computer readable storage medium can be used in this context, such as magnetic or optical storage media. As used herein, the term "computer readable storage medium" does not mean an electrical signal separate from an underlying physical medium. Additionally, as will be readily apparent to one of ordinary skill in the relevant art, software portions of the present invention can be instantiated (for example as object code or executable images) within the memory of any programmable computing device, such that when the processor of the computing device processes the components, the computing device executes their associated functionality. It will be further readily apparent to those of ordinary skill in the relevant art that the terms "computer system" and "computing device" means one or more computers configured and/or programmed to execute the described functionality. Accordingly, the disclosure of the present invention is intended to be illustrative, but not limiting, of the scope of the invention, which is set forth in the following claims

What is claimed is:

1. A computer implemented method for generating and using search resource locators, the method comprising the steps of:

generating a set of search terms corresponding to specific content, by a computer comprising at least a processor and a memory, such that a search for the generated set of search terms returns target content corresponding to the specific content;

assembling a search resource locator for locating target content corresponding to the specific content, by the computer comprising at least the processor and the memory, said search resource locator containing neither a location of the target content nor a location of the specific content; and including the generated search terms in the search resource locator, by the computer comprising at least the processor and the memory, such that selecting the search resource locator causes execution of the search for the generated search terms, said search returning target content corresponding to the specific content.

2. The method of claim 1 further comprising:
generating the set of search terms corresponding to the specific content with a desired level of precession, by the computer comprising at least the processor and the memory, such that the target content to be located by using the search resource locator matches the specific content within a specified degree of tolerance.

3. The method of claim 2 wherein the specified degree of tolerance is one from a group consisting of:
an exact match of the specific content;
a modified version of the specific content; and
content substantially similar to the specific content.

4. The method of claim 1 wherein the source resource locator further comprises one from a group consisting of:
the search terms and a uniform resource locator of a search engine;
the search terms, the uniform resource locator of the search engine, and instructions for passing the search terms to the search engine and linking a user to the returned content;
the search terms as parameters within the uniform resource locator of the search engine;
markup language configured to pass the search terms to the search engine and link the user to the returned content; and
markup language configured to generate the search terms, pass the search terms to the search engine and link the user to the returned content.

5. The method of claim 1 wherein:
the specific content and the target content each comprise at least one web page.

6. The method of claim 1 wherein the generating step is performed by at least one component from a list of components consisting of:
a web browser component executing on the computer comprising at least the processor and the memory;
a generation tool executing on a server computer comprising at least the processor and the memory; and
a generation tool executing on a client computer comprising at least the processor and the memory.

7. The method of claim 1 further comprising:
including at least one search resource locator on at least one web page by the computer comprising at least the processor and the memory.

8. The method of claim 7 further comprising:
responsive to a user selecting the search resource locator on the web page, executing a corresponding search and linking the user to a resulting web page, by the computer comprising at least the processor and the memory.

9. The method of claim 7 further comprising:
responsive to a user selecting the search resource locator on the web page, executing a corresponding search and displaying a list of results to the user, by the computer comprising at least the processor and the memory.

10. At least one computer readable storage medium storing a computer program product for generating and using search resource locators, the computer program product comprising:
program code for generating a set of search terms corresponding to specific content, such that a search for the generated set of search terms returns target content corresponding to the specific content;
program code for assembling a search resource locator for locating target content corresponding to the specific content, said search resource locator containing neither a location of the target content nor a location of the specific content; and
program code for including the generated search terms in the search resource locator, such that selecting the search resource locator causes execution of the search for the generated search terms, said search returning target content corresponding to the specific content.

11. The computer program product of claim 10 further comprising:
program code for generating the set of search terms corresponding to the specific content with a desired level of precession such that the target content to be located by using the search resource locator matches the specific content within a specified degree of tolerance.

12. The computer program product of claim 11 wherein the specified degree of tolerance is one from a group consisting of:
an exact match of the specific content;
a modified version of the specific content; and
content substantially similar to the specific content.

13. The computer program product of claim 10 wherein the source resource locator further comprises one from a group consisting of:
the search terms and a uniform resource locator of a search engine;
the search terms, the uniform resource locator of the search engine, and instructions for passing the search terms to the search engine and linking a user to the returned content;
the search terms as parameters within the uniform resource locator of the search engine;
markup language configured to pass the search terms to the search engine and link the user to the returned content; and
markup language configured to generate the search terms, pass the search terms to the search engine and link the user to the returned content.

14. The computer program product of claim 10 wherein:
the specific content and the target content each comprise at least one web page.

15. The computer program product of claim 10 further comprising:
program code for including at least one search resource locator on at least one web page.

16. The computer program product of claim 15 further comprising:
program code for, responsive to a user selecting the search resource locator on the web page, executing a corresponding search and linking the user to a resulting web page.

17. The computer program product of claim 15 further comprising:
program code for, responsive to a user selecting the search resource locator on the web page, executing a corresponding search and displaying a list of results to the user.

18. A computer system for generating and using search resource locators, the computer system comprising:
a processor;
a system memory;
hardware means for generating a set of search terms corresponding to specific content, such that a search for the generated set of search terms returns target content corresponding to the specific content;

hardware means for assembling a search resource locator for locating target content corresponding to the specific content, said search resource locator containing neither a location of the target content nor a location of the specific content; and hardware means for including the generated search terms in the search resource locator, such that selecting the search resource locator causes execution of the search for the generated search terms, said search returning target content corresponding to the specific content.

19. The computer system of claim 18 wherein the source resource locator further comprises one from a group consisting of:

the search terms and a uniform resource locator of a search engine;

the search terms, the uniform resource locator of the search engine, and instructions for passing the search terms to the search engine and linking a user to the returned content;

the search terms as parameters within the uniform resource locator of the search engine;

markup language configured to pass the search terms to the search engine and link the user to the returned content; and markup language configured to generate the search terms, pass the search terms to the search engine and link the user to the returned content.

20. The computer system of claim 18 further comprising:

hardware means for including at least one search resource locator on at least one web page; and hardware means for performing at least one step from a group of steps consisting of:

responsive to a user selecting the search resource locator on the web page, executing a corresponding search and linking the user to a resulting web page; and responsive to a user selecting the search resource locator on the web page, executing a corresponding search and displaying a list of results to the user.

\* \* \* \* \*